United States Patent
Heilmann et al.

[11] Patent Number: 6,004,311
[45] Date of Patent: *Dec. 21, 1999

[54] CONNECTING ARRANGEMENT AND PROCESS FOR CONNECTING TWO SEPARATE PARTS OF A MEDICAL SYSTEM

[75] Inventors: Klaus Heilmann, Wendel, Germany; Thomas Nicola, Spichere, France

[73] Assignee: Fresenius AG, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/712,099

[22] Filed: Sep. 11, 1996

[30] Foreign Application Priority Data

Sep. 16, 1995 [DE] Germany .............. 195 34 413

[51] Int. Cl.⁶ .............. A61M 25/00; D02G 3/00
[52] U.S. Cl. .............. 604/533; 604/905; 604/534; 428/375; 428/376; 428/398; 428/407
[58] Field of Search .............. 604/905, 533, 604/534, 535, 375; 428/421, 36.9, 376, 407, 383; 156/243, 326, 84; 138/137; 423/70, 222, 392; 525/28, 57, 60, 92

[56] References Cited

U.S. PATENT DOCUMENTS

| | | |
|---|---|---|
| 3,143,364 | 8/1964 | Klein. |
| 3,476,408 | 11/1969 | Wolfe. |
| 3,942,529 | 3/1976 | Waage. |
| 4,211,741 | 7/1980 | Ostoich ............... 264/173 |
| 4,251,310 | 2/1981 | Goldhaber et al.. |
| 4,289,337 | 9/1981 | Roe. |
| 4,352,702 | 10/1982 | Bornstein ............... 156/84 |
| 4,516,977 | 5/1985 | Herbert. |
| 5,284,184 | 2/1994 | Noone et al. ............... 138/121 |
| 5,356,709 | 10/1994 | Woo et al. ............... 428/376 |
| 5,626,930 | 5/1997 | Fukushi ............... 428/36.9 |

FOREIGN PATENT DOCUMENTS

| | | |
|---|---|---|
| 0 136 848 A2 | 9/1984 | European Pat. Off.. |
| 0 495 729 A2 | 1/1992 | European Pat. Off.. |
| 0 516 302 A1 | 5/1992 | European Pat. Off.. |
| 0 619 998 A1 | 3/1994 | European Pat. Off.. |
| WO 82/04016 | 11/1982 | WIPO. |

*Primary Examiner*—Ronald Stright
*Assistant Examiner*—David J. Cho
*Attorney, Agent, or Firm*—Fulbright & Jaworski L.L.P.

[57] ABSTRACT

A connecting arrangement for a medical system, having a first part including a plastic material that is dimensionally stable at a heat-treatment temperature and a second part including a plastic material that is not dimensionally stable at the heat-treatment temperature and thus tends to flow under a compressive force; in which the plastic materials do not contain any PVC or EVA. The connection is made by bringing the surfaces on the first and second parts together with subsequent heat-treatment under a compressive force, wherein the second plastic material tends to flow under the simultaneous effects of temperature and compressive force.

30 Claims, 1 Drawing Sheet

CONNECTING ARRANGEMENT AND PROCESS FOR CONNECTING TWO SEPARATE PARTS OF A MEDICAL SYSTEM

FIELD OF THE INVENTION

The invention relates to the problem of the well-sealed and firm connection of two separate parts that are constituents of a medical system.

BACKGROUND OF THE INVENTION

The following are mentioned as belonging to the prior art:

U.S. Pat. No. 4,516,977 to Herbert (D1),

EP-A-0 136 848 to Baxter Travenol Laboratories, Inc. (D2) and

WO-A-82/04016 also to Baxter Travenol Laboratories, Inc.(D3).

Connecting arrangements or connecting techniques with which the present invention is concerned are disclosed, inter alia, in D1. The object of D1 is a medical bag for storing blood or infusion solutions, in which a connecting piece made of a dimensionally stable plastic material is inserted into the body of the bag made of a different plastic material, wherein, to produce a firm and fluid-tight connection between bag and connecting piece, a bonding layer made of a non-crosslinked copolymer made from an olefin and vinyl acetate or polyurethane is arranged between the connecting piece and the sections of the body of the bag found to be in contact with it.

For the medical bag in accordance with D1, plastic materials based on polyolefins are suggested, inter alia those based on polyethylene, polypropylene and polybutylene. In addition to these homopolymers, plastic materials are also mentioned in D1 that are substituted olefins containing, for example, methyl, ethyl, vinyl or halogen substituents. Copolymers or blends of corresponding materials are also suggested.

Polyethylenes with average to high densities, high molecular weights and narrow molecular weight distributions are particularly preferred for the bag. Furthermore, according to D1, care should be taken to ensure, in this case, that the polyolefins have a melting point below the sterilization temperature of 110 to 120° C.

Suitable plastics for use for connecting pieces or inserts (in accordance with D1), are relatively rigid and transparent plastic materials and are deformed only at a pressure of at least 2 bar, for example rigid PVC, polypropylene, polyamide, polycarbonate, polyester, polyacrylates and similar materials and/or copolymers based on the previously mentioned compounds and styrene-containing copolymers, but in particular polycarbonates.

Materials for the bonding layer include, according to D1, copolymers of an olefin with vinyl acetate or a polyurethane. The bonding layer is between 0.1 and 7 mm thick and, to produce a connection between the connecting fittings piece or insert and bag, is arranged so that a length of tubing of the bonding layer material is drawn over or brushed onto the exterior of the insert or connecting tube, then the insert is pushed into the opening provided for it in the bag and finally the whole unit is welded together.

It is also possible to weld the bonding layer to the connecting piece first, for fixing purposes, and then to introduce this into the prepared connector opening in the bag and seal this unit. In this case, after the welding procedure, the bonded system is autoclaved at approximately 120° C. and 2 bar. During the heat-sealing process itself (welding), the bag is bonded to the ethylene/vinyl acetate copolymer in the intermediate layer, the bag also preferably being made of polycarbonate, like the connecting piece.

The connecting technique in accordance to D1 is disadvantageous for a number of reasons. On the one hand the interpositioning of a connecting layer between the separate parts of the system to be connected is a relatively complicated procedure. On the other hand, the bag is not suitable for recycling due to the use of different materials (the bonding layer is not made of a polyolefin material).

The object of D2 is another connecting technique. This discloses a flexible bag made of ethylene/vinyl acetate copolymers (EVA), in which a multi-layered connection tube made of a plastic material is arranged so that it is in fluid connection with the interior of the bag, wherein the tube has an outer layer which contains an ethylene/vinyl acetate copolymer which can be connected to the internal surface of the bag. In this case the seal is preferably achieved by means of a high frequency energy sealing process. Apart from the fact that the multi-layered tubes, connecting pipes or fittings have PVC-containing layers, wherein PVC is not a material which gives no concern during waste disposal procedures, and furthermore which almost always contains plasticizer which can diffuse out of the material into the solution being stored, a mixture of PVC and vinyl acetate is very difficult to separate during recycling procedures.

D3 also discloses a connector designed specifically for connecting two different plastic materials as an intermediate layer which is particularly suitable for connecting medical containers such as, for instance, blood bags to flexible tubes, when the parts to be connected consist of materials which are incompatible with each other so that direct welding of the separate parts to each other is not possible.

The intermediate item in accordance with D3 is a coextruded or injection moulded multi-layered connector with layers made of different plastic materials, wherein one of the layers "melts" at a lower temperature than the others.

D3 mentions polyvinylchloride as the material in the inner connector layer, whereas the outer layer consists of a lower melting polymer, for example polyethylenevinylacetate (EVA). In this embodiment, the connector in accordance with D3 is suitable, for instance, for connecting a PVC tube to a polyethylene container whose connecting piece consists of a material containing propylene units and polyethylenevinylacetate units as the first and second components.

To form the connection, the PVC tube is now placed in contact with the inner layer of the connector, for example using a solvent such as cyclohexanone. The outer layer of the connector is then introduced into the connection section of the bag under sliding contact, after firmly fixing the inner tube/connector link. The entire tube/connector/connecting piece/bag arrangement is then taken up to a temperature which is sufficient to melt the EVA in the external layer of the connector and to bond with the connecting piece. This thermal treatment can be performed, inter alia, in an autoclave.

To bond separate parts made of similar materials and to lower the temperature required to heat-bond them, D3 suggests the use of two connectors, the first with a low-melting plastic material outer layer (EVA) and a higher melting plastic material inner layer (PVC) and a second with the reverse sequence of layers. The two connectors with different diameters are then pushed together so that the PVC layers are in contact with each other. The two PVC layers are then solvent-sealed (cyclohexanone) together. The resulting "double connector" then has two low-melting plastic material outer layers which can be used in a known manner for connecting EVA bags and tubes.

In several ways, the disclosure published in D3 is also associated with disadvantages for the person skilled in the art.

On the one hand, at least one additional connector part is required each time to connect a medical system (bag+tube). On the other hand, in the end at least two steps are always required to produce the connection. Thus solvent-welding of the PVC layers in the connector and the tube or even of two connectors regularly precedes heat-treatment, which is really quite a complicated procedure. Finally, D3 is directed exclusively towards classical PVC and EVA materials which, from a current point of view, appear rather dubious, especially against the background of the plasticizer problems associated with PVC.

SUMMARY OF THE INVENTION

The present invention provides an improved connecting arrangement for a medical system, in which the plastic material does not contain any PVC of EVA. More particularly, the connecting arrangement comprises a first separate part including a first plastic material, and a second separate part including a second plastic material, in which the first plastic material contains at least one polymer that is dimensionally stable at the temperature of heat-treatment, and the second plastic material is no longer dimensionally stable at the temperature of heat-treatment and tends to flow under a compressive force, wherein neither plastic material contains any PVC or EVA.

A process for connecting the two separate parts comprises providing a first separate part in which at least one section of a surface thereof is made of a first plastic material, and a second separate part with at least one section of a surface thereof made of a second plastic material. The first and second parts are brought together to form a connected arrangement, with the formation of a contact area defined by the areas of said sections of the respective surfaces of the first and second separate parts that are touching and the assembled connecting arrangement is subjected to a heat-treatment sufficient for sterilization. The arrangement is then cooled to form a firm and well-sealed connection between the first and second separate parts. In this process, the first plastic material contains at least one polymer that is dimensionally stable at the temperature of heat-treatment, the second plastic material contains at least one polymer that is no longer dimensionally stable at the temperature of heat-treatment and tends to flow, and neither plastic material contains any PVC or EVA.

DETAILED DESCRIPTION OF THE INVENTION

Figure 1:
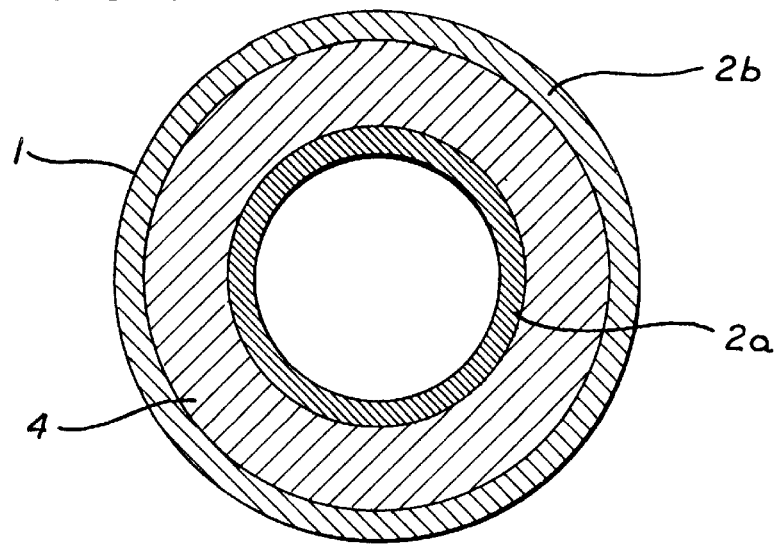
FIG. 1 is a cross-section through an embodiment of a second separate part in a connecting arrangement according to the invention, wherein the second separate part is a non-PVC multi-layered tube.

In particular, the invention relates to a connecting arrangement comprising separate first and second parts in which at least one section of the surface made of a first plastic in the first separate part, and at least one section of a surface made of a second plastic in the second separate part, form a firm and well-sealed connection with each other in a contact area which includes at least part of the surfaces of the first and second parts which are touching, which is obtainable by bringing the surfaces of the first and second separate parts to be connected into contact with each other, followed by heat-treatment of the surfaces of the separate parts which are in contact and subsequent cooling.

The invention also relates to a process for connecting two separate parts which are constituents of a medical system, with the objective of producing a well-sealed and firm connection. More particularly, a process for connecting two separate parts that are constituents of a medical system in which at least one section of a surface of the first separate part made of a first plastic material, and at least one section of a surface of the second separate part made of a second plastic material, are brought together to form a connecting arrangement, with the formation of a contact area which is defined by the areas of the first and second separate parts that are touching, then the assembled connecting arrangement is subjected to a heat-treatment to form a firm and well-sealed connection between the first and second separate pates and subsequently cooled.

In view of the prior art discussed above, the object of the invention is to provide a connecting arrangement or connecting technique that enables the production of a firm and fluid-tight connection between two or even several separate parts which are constituents of one system. The connecting arrangement is intended to be made from PVC-free and vinyl-free materials, and contain no plasticisers, bonding agents or other additives. In particular, however, the connecting technique is intended to manage without additional connectors or connecting parts or the like when connecting two separate parts which are constituents of one medical system such as, for instance, tube and connection points. The invention also provides information about a process for connecting two separate parts of a medical system without additional auxiliary agents, using only heat-treatment. At the same time, however, all the separate parts must be dimensionally stable.

This object and others not stated in detail is achieved by a connecting arrangement of the design wherein the first plastic material contains at least one polymer that is dimensionally stable at the temperature of heat-treatment, whereas the second plastic material is no longer dimensionally at the temperature of heat-treatment and tends to flow under a compressive force, in which neither plastic material contains any PVC or EVA. Advantageous developments of the invention further include embodiments wherein the connection is obtainable by bringing into contact the surfaces of the first and second separate parts with simultaneous application of a force that presses the surfaces together and heat-treatment of the separate parts while they are pressed together. In a further embodiment, the softening point of the first plastic material is higher than, and that of the second plastic material is lower than or equal to, the temperature of heat-treatment. In other embodiments, the heat-treatment is a heat sterilization process, or is greater than or equal to 121 degrees Celsius.

In yet other embodiments, the first and second separate parts are constituents of a medical bag system for medical solutions, or are constituents of a tube system for medical applications. Other embodiments include those in which the first separate part is a connector, insertion section or connecting piece in a medical system and the second separate part is a non-PVC multi-layered tube for medical purposes, and wherein the separate parts being connected consist entirely of plastic material. Further, in the first separate part, at least the contact area can consist of polypropylene (PP), polycarbonate (PC), a copolymer containing structural units based on the previously mentioned homopolymers and/or of blends that are based on the previously mentioned polymers, together with up to 40 wt. % of the plastic material which comprises the contact area of the second separate part.

More particularly, in another embodiment at least the contact area of the first separate part, consists of a blend containing (a) 60 to 100 wt. % of polypropylene of polycarbonate, and (b) 40–0 wt. % of polyethylene copolymer or SEBS/SEPS with a diblock fraction or a polyether block amide. In yet another, the first separate part, at least in the contact area, consists of a polypropylene copolymer.

In a further embodiment, the second separate part is a non-PVC tube with at least one connecting layer made of a second plastic material, wherein the second plastic material contains at least one polymer having a softening point lower that or equal to the temperature of heat-treatment, or where the polymer composition of the connecting layer is no longer dimensionally stable at $\leq 121$ degrees Celsius. A further embodiments are characterised in that the layers in the non-PVC tube stick together without additional bonding agents and are substantially free of plasticisers, antiblocking agents, antistatic agents and other fillers; or where the second plastic material in the connecting layer is a polymer or a blend made of. (a) 40–100% PE copolymer and 0–60% SEPS/SEP, (b) 40–100% PE copolymer and 0–60% SEBS/SEB, (c) 100% SEPS/SEP, (d) 40–100% SEBS/SEB 0–60% SEBS, or 100% polyether block amide.

From a process engineering point of view, the assembly of the two separate parts of the medical system described above represents a solution to the problem on which the invention is based. Advantageous modifications to the process of the invention include assembling the first and second separate parts in a pressure zone, wherein the second plastic material tends to flow at the temperature of heat-treatment under the effects of a force pressing together the surfaces in a contact area. Further, the process may include assembling, as a first separate part, a connector or an insertion section made of plastic material and, as a second separate part, a coextruded non-PVC tube. In this instance, the connector or insertion section of the first part may comprise polypropylene or polypropylene mixed with a polyethylene copolymer or a styrene/ethylene/butylene ((propylene) rubber, and is connected to a coextruded non-PVC multi-layer tube having a connecting layer comprising a polyethylene copolymer, SEPS or SEBS with a diblock fraction or mixtures thereof As a result of the first plastic material containing at least one polymer that is dimensionally stable at the temperature of the heat-treatment procedure, while the second plastic material contains at least one polymer that is no longer dimensionally stable at the temperature of the heat-treatment procedure, and can flow under the effect of a compressive force, that is under pressure, i.e. tends to flow, wherein both plastic materials are free of PVC and EVA and in a particularly preferred embodiment the first separate part, at least in the contact area, consists of polypropylene (PP), polycarbonate (PC), a copolymer containing structural units which are based on the previously mentioned homopolymers and/or blends based on the previously mentioned polymers, with up to a 40 wt. % fraction, with respect to the total weight of plastic material in the first separate part, of the second plastic material, wherein the second plastic material is a PE-copolymer, SEBS/SEPS with a diblock fraction and/or a polyether block amide, can be advantageously used to prepare a connecting arrangement that 1. completely avoids the use of materials like PVC or EVA;
2. in a simple way, forms the well-sealed, firm and durable connection of two separate parts which are constituents of one medical system during a heat-treatment which is simple to perform; to be precise
3. without complicated additional connectors in the form of connection or adapter tubes being required (additional connectors are, however, possible) and
4. without additional sealing techniques such as, for instance, the use of solvents, also having to be used.

The stable connection is produced in an advantageous manner during the heat sterilization processes routinely used for medical systems, so that no additional step is required.

The connecting arrangement according to the invention is a component of a medical system. This is understood to include, in the scope of the invention and in the widest sense, all containers, vessels, tubes, bags and associated connecting elements used in the medical-technical sector which, during correct and specified use, come into contact with body fluids, such as blood, or fluids intended for therapeutic treatment of the human body, such as for instance infusion solutions.

In this case, use of the expression "system" in accordance with the invention also includes an arrangement of at least two separate parts or elements which are intended to be firmly and reliably connected to each other when using the system so that there is no risk to perfect functioning of the system.

Examples of medical systems include, inter alia, medical bag systems for solutions that are fitted with connectors, insertion sections or connecting pieces and have to be connected to tubes, tube systems or tube kits in order to ensure the transport of medical solutions for therapeutic treatment. Also included among medical systems are the tube kits themselves, which necessitate the connection of tubes to several units together, for example using connectors suitable for this purpose or any other elements familiar to and used by a person skilled in the art in the medical engineering sector.

For a firm and well-sealed connection to be formed, in the scope of the invention, between two separate parts which are constituents of one system, the separate parts to be connected in accordance with the invention at least have surfaces that at least partly consist of a plastic material. In this case it is sufficient that at least specific sections of each of the surfaces on the separate parts consist of plastic materials, wherein the specific sections come into contact with each other to form the connection. The surfaces on the separate parts that come into contact with each other define a contact area, wherein it is understood that the contact area does not consist of surfaces in general on the first and second separate parts which are touching, but in particular the sections made of plastic material that are touching when the separate parts of the system are arranged in the particular orientation in which the connection is intended to be made. Thus, it is stipulated that the contact area is restricted to the surface sections made of plastic material which are touching, whereas surface sections on the first and second separate parts themselves may also be touching each other over an area outside of the contact area defined in this way.

The firm and well-sealed connection of the separate parts according to the invention is expediently obtainable by bringing the surfaces into contact with simultaneous application of a force pressing the surfaces together, heat-treatment of the separate parts while they are pressed together and then cooling.

By this, it is understood that the separate parts are subject to pressure when they fit into or onto each other, this producing a force which presses the touching surfaces of the separate parts together, which on the one hand ensures a certain dimensional stability for the arrangement of separate parts to be connected before forming the firm and permanent connection and on the other hand fixes together in intimate material contact the surface sections on the separate parts forming the contact area of the touching surfaces.

Thus, in the invention, with the simultaneous application of a force that presses the surfaces together in particular the fact has to be understood that at least one of the separate parts to be connected is deformed by a load or a force (when pushed together), but after removal of the load or force it strives to return to its original shape. This "elastic" behavior is of special advantage according to the invention, wherein the prior deformation can be produced in any way which seems appropriate to a person skilled in the art. Possible methods are, inter alia, compression, compression-setting, bending, dislocating, twisting and the like.

The invention is based on the idea of providing a connecting arrangement by appropriate selection and adjustment of the polymers forming the plastic materials in the contact area, while at the same time not using PVC or EVA at all, which can be produced, firmly and reliably, in a single heat-treatment process without using additional adhesive, sealing or fixing materials or auxiliary agents or other sealing processes such as, for instance, high frequency energy or the like. In particular, the fundamental inventive idea is to provide a firm connection between a connector or insertion section and a tube in such a way that the contact area of the tube and connector or insertion section consists of materials or contains a certain proportion of materials which bond firmly to each other during subsequent heat-treatment, in particular heat sterilization, followed by,cooling.

With regard to the invention, "plastic materials" are understood to be those materials whose essential constituents consist of macromolecular organic compounds, wherein the plastic materials may contain one or several polymers or also may be designated simply as polymers, wherein polymers includes in particular homopolymers and also copolymers (also statistical, block and/or graft polymers) and mixtures (=blends) of the substances mentioned.

An important criterion for selection and assignment of a polymer to a plastic material according to the invention, both in the first and in the second separate part (to be precise in the particular contact area), is the dimensional stability under sterilization conditions (flowability) of the polymer. Dimensional stability depends substantially on the softening temperature (on the Vicat temperature), on the material hardness and on the E-modulus of the substance used.

The softening temperature is determined by the Vicat method for polymers and plastic materials in the invention, i.e., it is defined as the temperature at which a specifically loaded steel pin with a cross-section of 1 mm$^2$ penetrates to a depth of 1 mm in a sample of the plastic which is being gradually heated (old DIN 53 460 364, new DIN-ISO 306).

As a result of the first plastic material in the first connecting part in accordance with the invention containing a polymer whose softening point is reached at temperatures higher than the temperature of heat-treatment, the requisite dimensional stability during the process of forming the connection is guaranteed, while the fact that the second plastic material contains a polymer which can flow under the connection pressure and which is no longer dimensionally stable at temperatures lower than or equal to the temperature of heat-treatment enables the actual connection to be formed. In the scope of the invention, therefore, polypropylene, polycarbonate and their copolymers or blends which are based on the homopolymers or copolymers mentioned with up to 40% of the polymer from the second separate part, for the 1st separate part, and PE-copolymers, SEBS/SEPS with a diblock fraction or a polyether block amide with a Shore hardness of D$\leq$32 for the second separate part, have proven particularly beneficial for forming the connecting arrangement. Furthermore, it is expedient if the first separate part is a blend with an up to 40 wt. % concentration of the polymer in the second separate part, and vice versa.

Basically, although it is sufficient, in the scope of the invention, that the plastic materials contain the appropriately polymers mentioned above, the invention can also be achieved with particularly good results if the plastic materials contain not only polymers whose dimensional stability corresponds to the previously mentioned criteria, but if the softening points of the plastic materials themselves are at temperatures higher than or lower than or equal to the temperatures during thermal treatment or are no longer reached. In this preferred case, the plastic material has the desired property not only partially in the form of one constituent in its material, rather the whole material possesses the desired range of properties.

In one embodiment, the first separate part contains up to 40 wt. % of the polymer in the second separate part. This produces better adhesion, provided the material viscosities are adjusted so that some of the polymer from the second separate part is located at the surface of the first separate part.

Thus, in principle the invention can be "adapted" to a number of heat-treatments and to the temperatures associated therewith.

The temperature which is of particular interest for softening the polymers or plastic materials according to the invention, that is the temperature of heat-treatment, is the temperature at which steam sterilization is normally performed. Here, in the scope of the invention, steam sterilization is generally understood to be a process for the destruction or inactivation (viruses) of all microorganisms including highly resistant persistent forms, wherein the materials according to the invention can be subjected to, in particular, steam sterilization in autoclaves using water vapor at a temperature of at least 121° C., corresponding for instance to a pressure greater than atmospheric, so-called autoclaving or autoclave treatment, without suffering any damage.

Thus, if the connection can be produced under the standard conditions for steam sterilization, sterilization and formation of the connection in the arrangement according to the invention can be effected in a single process. In this case, it is preferred that the polymer or plastic material in the second separate part only softens, that is passes into a fluid state, under these conditions when it is subjected to a compressive force. At points where there is no additional force applied, the fluid state is not fully achieved. If such were the case, in fact, the object of the connecting arrangement would no longer be achievable, that is entering into a sufficiently firm, well-sealed and resistant connection with another plastic material in a connection partner, without the dimensional stability of the tube or the body of the connection partner in areas not being bonded becoming uncontrollable.

The connecting arrangement in accordance with the invention, as already mentioned, can comprise and connect separate parts in which only specific sections consist of plastic material. In an advantageous development, the connecting arrangement in the invention, however, is characterized in that the separate parts being connected consist entirely of plastic materials. This permits in particular production of the separate parts by the advantageous processes of plastics process engineering and furthermore is of particular advantage for use in the medical sector. In an expedient form of the connecting arrangement according to the invention, the first separate part consists, at least in the contact area, of a plastic material or blend of plastic materials, containing a) 60–100 wt. % of polypropylene or polycarbonate and
b) 40–0 wt. % of a polyethylene copolymer or SEBS/SEPS with a diblock fraction or a polyether block amide.

30–10 wt. % of component b) is preferred.

The first separate part quite particularly consists, at least in the contact area, of polypropylene.

With regard to the second separate part, in particular in the case where it is a non-PVC multi-layered tube for medical purposes, this should possess at least two layers, one of which is a base layer made of a third plastic material with at least one connecting layer made of the second plastic material, wherein the third plastic material contains at least one polymer whose softening temperature is reached at temperatures higher than that of the heat-treatment, whereas the second plastic material contains at least one polymer which can flow under the connection pressure at a temperature lower than or equal to the temperature of heat-treatment. A particularly appropriate tube is a flexible tube which is thermally stable during heat sterilization and is transparent after heat sterilization has been performed, has adequate buckling resistance and which can be sealed off with tube clamps or the like which can be connected, in a firm and well-sealed manner, to a first separate part in the form of an insertion section in a medical bag or a connector, to be precise during heat sterilization treatment.

While, even in the presence of only a small proportion by weight of polymers with the desired softening behavior, the formation of a connection according to the invention, with simultaneously guaranteed stability and flexibility of the tube, can frequently be achieved in the scope of the invention, when the greater part of the plastic material or polymer in each individual layer of the tube possesses the desired property the overall behavior of the tube material is improved and the risk that adequate formation of the connection during steam sterilization does not occur is excluded. Therefore, a particularly favorable further development of the invention is characterized in that the base layer softens and can deform at temperatures >121° C. and each connecting layer which is deformable at temperatures ≦121° C. softens under the connection pressure.

The tube according to the invention can, for instance, be "pushed" onto a connector or fitting on a component (as the first separate part) made of a suitable material so that the inner layer of the tube is in contact with the outer surface of the connector or is designed for insertion into a hollow section whose inner surface is made of a suitable material for forming a connection, wherein the provision of two connecting layers (outer and inner) in the separate part "non-PVC multi-layered tube" means that either of the two connecting possibilities may be selected or both may implemented simultaneously.

With regard to the formation of the connection with other components such as bags, connectors, connecting pieces or similar, it should be noted that basically in an extremely preferred modification, to form a well-sealed and stable connection, not only is the effect of the temperature of heat sterilization required but that, as already explained, another factor also plays an essential part. To be precise, this is the compressive force under which the two areas to be connected are brought into contact during the action of the temperature of heat sterilization. To implement the invention, therefore, it is also preferred that the separate part "non-PVC multi-layered tube" forms a pressure seat with the separate part "connector or connecting piece on a bag" so that gelling of the layers capable of forming the connection takes place during steam sterilization, supported by the application of force and interlocking of the surfaces (compressive force), wherein adhesion is enabled on the one hand by the melting of softened material layers during intimate contact and on the other hand by surface adhesion due to the selection of appropriate surfaces, for example those with particularly rough profiles.

In the preferred separate part "non-PVC multi-layered tube" according to the invention the connecting layer, which is exposed in order to connect to the connector, is preferably mainly composed of a styrene ethylene butylene (or propylene) rubber with a diblock fraction or a PE copolymer, whereas the base layer is preferably mainly composed of a polypropylene or SIS. This combination of materials for the base layer and connecting layer or layers can immediately offer a number of the properties demanded. It is especially advantageous to the invention if the base layer is a blend containing, with respect to the total amount of the third plastic material and in wt. %

| | | |
|---|---|---|
| a) | 40–100% PE copolymer | (Exact 4022, Exon) |
| | 0–60% SEBS/SEB | (Kraton G 1726, Shell) |
| b) | 40–100% PE copolymer | (Engage XU 58.000.52, Dow Chemical) |
| | 0–60% SEBS/SEB | (Kraton G 1726, Shell) |
| c) | 100% SEPS/SEPS | (Septon 2277, Kuraray) |
| d) | 40–100% SEBS/SEB | (Kraton G 1726, Shell) |
| | 0–60%SEBS | (Kraton G 1652,Shell) |
| | or | |
| e) | 100% polyether block amide | (Pebax 35335SA, ATO) |

In this case, SEBS/SEB (Kraton G 1726) is a low molecular weight SEBS with at least a 20% fraction of diblocks.

A tube with one of the connecting layers described above can preferably be bonded to a connector made of polypropylene random copolymer or polypropylene homopolymer, whereas polyether block amides can be bonded to polycarbonate.

Basically it is preferred in the scope of the invention and generally it is also guaranteed that the different layers substantially do not contain any plasticisers, antiblocking agents, antistatic agents or other fillers, despite a concentration of conventional components for stabilizing purposes. This counters in particular the known plasticizer problems of PVC.

The connecting layer can also be applied to both sides of the base layer. Furthermore, the connecting layer may include up 30 wt. % of the material in the base layer and vice versa. As a result of this "material exchange" or substitution of material, the compatibility of the layers moulded together to produce for example a tube is greatly increased, without the other properties being affected.

A further particularly preferred feature of the invention is regarded as being that in the further development of known connecting arrangements in accordance with the invention, the plastic materials for all the separate parts in the arrangement are selected so that they consist substantially of polyolefin homopolymers or polyolefin copolymers. It was particularly surprising that, using the invention, it was possible for the first time to provide a connecting technique, that is a connection between a medical bag and for example a non-PVC multi-layered tube, which consists entirely of easily recyclable materials, which enables the problem-free formation of a connection between the two parts or with connectors made of environmentally friendly materials during steam sterilization and at the same time satisfies all the other requirements of a system for use in the medical sector.

The invention also provides a process for connecting two separate parts that are constituents of a medical system in which, with the formation of a contact area that is defined by the areas of the first and second separate parts that are touching, at least one section of a surface of the first separate part made of a first plastic material is placed in contact with at least one section of a surface of the second separate part made of a second plastic material, then the assembled connecting arrangement between the first and second separate parts is subjected to a heat-treatment and is then cooled in order to form a firm and well-sealed connection between the first and second separate parts, wherein the invention is characterized in that a first plastic material is used which contains at least one polymer whose dimensional stability is provided at the temperature of heat-treatment, whereas a second plastic material is used that contains at least one polymer that is no longer dimensionally stable at the temperature of the heat-treatment and tends to flow, wherein neither plastic material contains any PVC at all. The first and second separate parts are preferably assembled with the application of pressure. It is beneficial if the polymer in the second plastic material is no longer dimensionally stable at the temperature of the heat-treatment and tends to flow under the action of a force (connection pressure or force) pressing the surfaces together. In a particularly preferred process modification, the first separate part, at least in the contact area, consists of polypropylene (PP), polycarbonate (PC), copolymers containing structural units on which the previously mentioned homopolymers are based, and/or consists of blends which are based on the previously mentioned polymers, advantageously with up to 40 wt. % of the polymer in the second separate part. The second separate part is preferably composed, in this case, of PE copolymers, SEBS/SEPS with a diblock fraction or of a polyether block amide.

In further preferred process variants of the invention, separate parts which are constituents of a bag system for medical solutions or those separate parts which are constituents of a medical tube system, are connected to each other. In addition, it is advantageous if a first separate part that is a connector or a separate part made of a plastic material and a second separate part that is a coextruded non-PVC multi-layered tube are connected to each other, wherein in all cases it is preferred that a sterilization process is used as heat-treatment under conditions known per se. Basically any temperature which is familiar to a person skilled in the art may be used for this. For example, it is common to perform a sterilization process at, for instance, about 116° C. However, the heat-treatment is preferably performed at a temperature of 121° C. Depending on the temperature desired, the properties of the materials in the two separate parts to be connected can be specifically modified, for instance by appropriate choice of the plastic materials used.

Thus it is of enormous advantage in the process according to the invention to use a first plastic material whose dimensional stability is retained at temperatures higher than 121° C., whereas a second plastic material is used that is flowable under a compressive force or the connecting pressure at temperatures lower than or equal to 121° C.

In an expedient process modification, the process according to the invention is characterized in that a coextruded non-PVC multi-layered tube is used as one of the separate parts, whose inner and/or outer layer consists of at least 30 wt. % of SEBS (SEPS) with a diblock fraction, whereas the connector or insertion section itself is made of polypropylene.

Furthermore, it may be advantageous to use a coextruded non-PVC multi-layered tube whose connecting layer is made of polyethylene copolymers, SEPS or SEBS with a diblock fraction or mixtures thereof and to use a connector or insertion fitting that consists of polypropylene or polypropylene mixed with polyethylene copolymers or styrene/ ethylene/ butylene (propylene) rubber.

Finally, it also preferred that a coextruded non-PVC multi-layered tube whose inner and/or outer layer consists of a polyether block amide and a connector or a insertion section that consists of polycarbonate are connected together.

In the following the invention is explained in more detail by means of working examples, with reference to the appended Figures.

The tube 1 shown in FIG. 1 is a coextruded non-PVC multilayered tube with three layers. The tube layers are built up from polyolefins, synthetic rubbers or combinations thereof. According to the invention, the inner layer 2a and/or outer layer 2b of the tube, depending on whether an inner or outer connection with the tube is required, is the connecting layer with a specific material or a special combination of materials which has the ability to enter into a firm connection during appropriate subsequent heat-treatment followed by cooling. The connecting layer 2a and/or 2b is preferably a very thin layer and the softening point of the layer or of parts of the layer is below the sterilization temperature under the effects of a compressive force. Particularly suitable materials for the connecting layer 2a and/or 2b are, inter alia, styrene/ethylene/butylene (or propylene) rubbers, a polyether block amide, PE copolymers or blends thereof. In the three-layered variant of tube 1 shown, layer 4 corresponds to the base layer mentioned in the description.

Preferred variants of tube 1 functioning as a separate part in the connecting technique according to the invention are those which have the following softening points for the individual layers:

|  | E-modulus | Hardness | Softening point under the effects of heat |
|---|---|---|---|
| Main (base) layer = layer 4 | $\leq 80$ N/mm$^2$ | Shore D $\leq 32$ | >121° C. |
| Connecting layer = layer 2a, 2b | $\leq 80$ N/mm$^2$ | Shore A $\leq 65$ | $\leq 121°$ C. |
| optional covering layer | <1000 N/mm$^2$ | <R90 | >121° C. |

Figure 2:
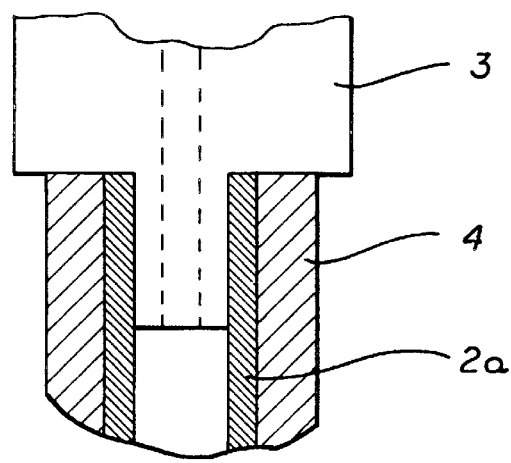
FIG. 2 is a longitudinal section through an embodiment of a connecting arrangement according to the invention made of a first and a second separate part, wherein the first separate part is a fitting, connector or insertion section, whereas the second separate part is a tube.
Figure 3:
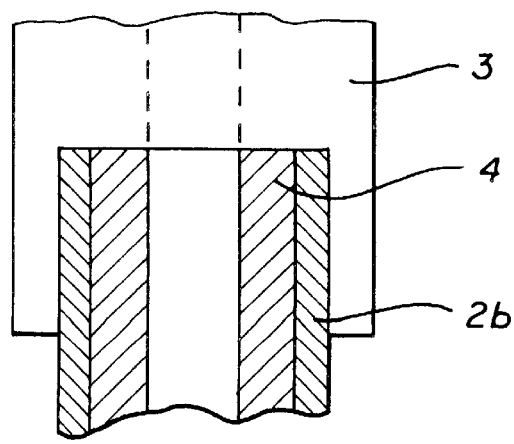
FIG. 3 is a longitudinal section through another embodiment of the connecting arrangement according to the invention.

As shown in FIGS. 2 and 3, the connector 3 (FIG. 2) or insertion section 3 (FIG. 3) together with the tube 1 represents a well-sealed system, due to the firm connection. For simplification, the embodiment of the connecting or bonding layer 2b shown in the embodiment in FIG. 2 has been omitted, whereas in FIG. 3 the inner layer 2a was omitted. It is understood that in the case of the embodiment of a tube shown in FIG. 1, corresponding connecting arrangements to those seen in FIG. 2 or FIG. 3 are also possible.

In accordance with their use, the connectors or insertion sections 3, due to, e.g., sealing requirements when connecting or during sterilization, have complicated structures and contours which retain their shape very well and since they should not undergo change during sterilization these are not shown in the accompanying diagrams.

Structural plastic materials, preferably with a high E-modulus and a softening point which is well above 121° C. are used for connectors/insertion sections 3. The connectors or insertion sections 3 preferably consist of polypropylene homopolymers, polypropylene random copolymers with a small ethylene content, polycarbonate or polymethylpentene. The parts themselves generally consist of injection or blow moulded parts, wherein in the scope of the invention a certain proportion of the material with diminishing dimensional stability at 121 C. contained in connecting layer 2a or 2b of the tube may be contained in connector 3.

The following tests explain the invention in more detail: A connecting technique produced from a lipped tube and a connector, wherein the separate parts have the following specifications:

1. Lipped tube: $\emptyset_A = 8$ mm
   $\emptyset_I = 6$ mm
   Structure from outside to inside: Sealing layer made of 50 wt. % PP-R and 50 wt. % SIS with a thickness of 40 μm; Base layer made of PP (Shore D≦32)
   and
   a thickness of 920 μm; and
   Connecting layer made of 60 wt. % of SEBS-compound and 40 wt. % SEBS/SEB with a thickness of 40 μm.
2. Connector: made of PP homopolymer;
   Conical shank, 0 increases from 6.2 to 6.8 mm;
   Surface of shank, smooth
3. Connector is pressed into the lipped tube and sterilized at 121° C. for a period of 20 min.

Test 1: Leakage test at 121° C.

The sterilized lipped tube/connector system is subjected to internal pressure in a heating cabinet (121° C.) after being heated for a period of 10 min.

To assess the air-tightness of the connection, the connector/tube fitting is suspended in an immersion bath (glycerine).

| Internal press | Time | Observation |
| --- | --- | --- |
| p = 0.1 bar | 15 min | no air-bubbles visible |
| p = 0.25 bar | 15 min | no air-bubbles visible |
| p = 0.5 bar | 10 s | after ca. 1 min. the tube blew off no air-bubbles visible |

Test 2: Leakage test at room temperature

The sterilized lipped tube/connector system is subjected to an internal pressure at room temperature (20° C.).

To assess the air-tightness, the connector/tube fitting is suspended in-an immersion bath (H₂0).

| Internal press. | Time | Observation |
| --- | --- | --- |
| p = 0.2 bar | 15 min | no air-bubbles visible |
| p = 0.5 bar | 15 min | no air-bubbles visible |
| p = 0.75 bar | 15 min | no air-bubbles visible |
| p = 1.0 bar | 15 min | no air-bubbles visible |
| p = 1.5 bar | 30 min | no air-bubbles visible |
| p = 2.0 bar | 10 min | air-bubbles visible |

Test 3: Performed as in test 1, but without prior sterilization of the lipped tube/connector system

| Internal press | Time | Observation |
| --- | --- | --- |
| p = 0.1 bar | 15 min | no air-bubbles visible |
| p = 0.2 bar | 15 min | no air-bubbles visible |
| p = 0.5 bar | 1 min | connector slipped out of the tube |

Test 4: Tensile test at 70° C.

The sterilized lipped tube/connector system is put under tension at the tube and connector ends using a tensile testing machines provided with a heating chamber. The heating chamber is set at a constant 70° C. The sample preheating time is 10 min.

| Tensile test: | Distance between clamping jaws: | 50 mm |
| --- | --- | --- |
| | Preload force: | 2 N |
| | Test speed: | 200 mm/min |
| | Sample | $F_{max}$ [N] |
| | 1 | 63.68 |
| | 2 | 56.35 |
| | 3 | 63.78 |

We claim:

1. A connecting arrangement for constituents of a medical system, comprising a first and a second separate part in which at least one section of a surface made of a first plastic material on the first separate part and at least one section of a surface made of a second plastic material on the second separate part are touching in a contact area that comprises at least sections of the surfaces of the first and second parts to form a firm and well-sealed connection with each other, in which the first plastic material contains at least one polymer which is dimensionally stable at a temperature of heat-treatment sufficient for sterilization, whereas the second plastic material is no longer dimensionally stable at the temperature of heat-treatment and tends to flow under a compressive force, and wherein the second separate part is a non-PVC tube with at least one connecting layer made of the second plastic material, wherein the second plastic material contains at least one polymer whose softening point is lower than or equal to the temperature of heat-treatment.

2. The connecting arrangement according to claim 1, in which the temperature of heat-treatment is ≧121° C.

3. The connecting arrangement of claim 1 in which the first separate part, at least in the contact area, consists of polypropylene, polycarbonate, a copolymer containing structural units based on polypropylene or polycarbonate and/or of blends thereof, together with up to 40 wt. % of the plastic material which comprises a portion of the second separate part in the contact area.

4. The connecting arrangement of claim 2 in which the first separate part, at least in the contact area, consists of polypropylene, polycarbonate, a copolymer containing structural units based on polypropylene or polycarbonate and/or of blends thereof, together with up to 40 wt. % of the plastic material which comprises a portion of the second separate part in the contact area.

5. The connecting arrangement of claim 1 in which the first separate part, at least in the contact area, consists of a blend containing
   a) 60 to 100 wt. % of polypropylene or polycarbonate and
   b) 40–0 wt. % of polyethylene copolymer or SEBS/SEPS with a diblock fraction or a polyether block amide.

6. The connecting arrangement of claim 2 in which the first separate part, at least in the contact area, consists of a blend containing
   a) 60 to 100 wt. % of polypropylene or polycarbonate and
   b) 40–0 wt. % of polyethylene copolymer or SEBS/SEPS with a diblock fraction or a polyether block amide.

7. The connecting arrangement of claim 1 in which the first separate part, at least in the contact area, comprises a polypropylene copolymer.

8. The connecting arrangement of claim 2 in which the first separate part, at least in the contact area, comprises a polypropylene copolymer.

9. The connecting arrangement of claim 1 in which the second plastic material in the connecting layer is a polymer or a blend made of
   a) 40–100% PE copolymer and 0–60% SEPS/SEP,
   b) 40–100% PE copolymer and 0–60% SEBS/SEB,
   c) 100% SEPS/SEP,
   d) 40–100% SEBS/SEB and 0–60% SEBS or
   e) 100% polyether block amide.

10. The connecting arrangement of claim 2 in which the second plastic material in the connecting layer is a polymer or a blend made of
    a) 40–100% PE copolymer and 0–60% SEPS/SEP,
    b) 40–100% PE copolymer and 0–60% SEBS/SEB,
    c) 100% SEPS/SEP,
    d) 40–100% SEBS/SEB and 0–60% SEBS or
    e) 100% polyether block amide.

11. A process for connecting two separate parts that are constituents of a medical system, comprising:
    providing a first separate part in which at least one section of a surface thereof is made of a first plastic material, and a second separate part with at least one section of a surface thereof made of a second plastic material;
    bringing the first and second parts together to form a connected arrangement, with the formation of a contact area defined by the areas of said sections of the respective surfaces of the first and second separate parts that are touching;
    subjecting the assembled connecting arrangement to a heat-treatment sufficient for sterilization; and
    thereafter cooling the arrangement to form a firm and well-sealed connection between the first and second separate parts;
    wherein the first plastic material contains at least one polymer that is dimensionally stable at the temperature of heat-treatment, the second plastic material contains at least one polymer that is no longer dimensionally stable at the temperature of heat-treatment and tends to flow, and wherein neither plastic material contains any PVC or EVA.

12. The process according to claim 11 in which the first and second separate parts are assembled with the formation of a pressure zone, wherein the second plastic material tends to flow at the temperature of heat-treatment under the effects of a force pressing together the surfaces in the contact area.

13. The process of claim 11 in which the first separate part, at least in the contact area, contains polypropylene, polycarbonate, a copolymer containing structural units based on polypropylene or polycarbonate and/or of blends thereof.

14. The process of claim 12 in which the first separate part, at least in the contact area, contains polypropylene, polycarbonate, a copolymer containing structural units based on polypropylene or polycarbonate and/or of blends thereof.

15. The process of claim 11 in which the first separate part comprises a connector or insertion section made of plastic material, the second separate part comprises a coextruded non-PVC tube, the connector or insertion section and tube being connected in the process.

16. The process of claim 12 in which the first separate part comprises a connector or insertion section made of plastic material, the second separate part comprises a coextruded non-PVC tube, the connector or insertion section and tube being connected in the process.

17. The process of claims 15 in which the coextruded non-PVC tube is a multilayered tube having a connecting layer comprising a polyether block amide, and the connector or insertion section comprising polycarbonate.

18. The process of claims 16 in which the coextruded non-PVC tube is a multilayered tube having a connecting layer comprising a polyether block amide, and the connector or insertion section comprising polycarbonate.

19. The process of claim 15 in which the coextruded non-PVC tube is a multi-layer tube having a connecting layer comprised of a polyethylene copolymer, SEPS, SEBS with a diblock fraction, or mixtures thereof; and the connector or insertion section is comprised of polypropylene, polypropylene mixed with a polyethylene copolymer, or a styrene/ethylene/butylene (propylene) rubber.

20. The process of claim 16 in which the coextruded non-PVC tube is a multi-layer tube having a connecting layer comprised of a polyethylene copolymer, SEPS, SEBS with a diblock fraction, or mixtures thereof; and the connector or insertion section is comprised of polypropylene, polypropylene mixed with a polyethylene copolymer, or a styrene/ethylene/butylene (propylene) rubber.

21. The process of claim 11 in which the heat-treatment is performed at a temperature of $\geq 121°$ C.

22. The process of claim 12 in which the heat-treatment is performed at a temperature of $\geq 121°$ C.

23. The process of claim 13 in which the heat-treatment is performed at a temperature of $\geq 121°$ C.

24. The process of claim 14 in which the heat-treatment is performed at a temperature of $\geq 121°$ C.

25. The process of claim 14 in which the heat-treatment is performed at a temperature of $\geq 121°$ C.

26. The process of claim 16 in which the heat-treatment is performed at a temperature of $\geq 121°$ C.

27. The process of claim 17 in which the heat-treatment is performed at a temperature of $\geq 121°$ C.

28. The process of claim 18 in which the heat-treatment is performed at a temperature of $\geq 121°$ C.

29. The process of claim 19 in which the heat-treatment is performed at a temperature of $\geq 121°$ C.

30. The process of claim 20 in which the heat-treatment is performed at a temperature of $\geq 121°$ C.

* * * * *